United States Patent [19]

Hine

[11] Patent Number: 5,652,864
[45] Date of Patent: Jul. 29, 1997

[54] CONCURRENT STORAGE ALLOCATIONS OR RETURNS WITHOUT NEED TO LOCK FREE STORAGE CHAIN

[75] Inventor: Gary Almiron Hine, Endwell, N.Y.

[73] Assignee: IBM, Armonk, N.Y.

[21] Appl. No.: 311,082

[22] Filed: Sep. 23, 1994

[51] Int. Cl.$^6$ .................................................. G06F 12/00
[52] U.S. Cl. ............................. 395/497.02; 395/497.01; 395/600; 395/650
[58] Field of Search ............... 395/497.01, 497.02, 395/497.03, 600, 650, 497.04, 477, 478, 480, 826, 827, 700

[56] References Cited

U.S. PATENT DOCUMENTS

| | | | |
|---|---|---|---|
| 4,536,837 | 8/1985 | Olson et al. | 395/600 |
| 4,937,736 | 6/1990 | Chang et al. | 395/418 |
| 4,975,870 | 12/1990 | Knicely et al. | 395/479 |
| 5,025,367 | 6/1991 | Gurd et al. | 395/600 |
| 5,062,038 | 10/1991 | Jordan, Jr. | 395/650 |
| 5,063,501 | 11/1991 | Jordan, Jr. | 395/726 |
| 5,063,502 | 11/1991 | Jordan, Jr. | 395/726 |
| 5,063,504 | 11/1991 | Jordan, Jr. | 395/726 |
| 5,109,336 | 4/1992 | Guenther et al. | 395/497.02 |
| 5,175,852 | 12/1992 | Johnson et al. | 395/600 |
| 5,210,848 | 5/1993 | Liu | 395/451 |
| 5,226,155 | 7/1993 | Iijima | 395/600 |
| 5,247,634 | 9/1993 | Cline et al. | 395/600 |
| 5,255,387 | 10/1993 | Arnold et al. | 395/600 |
| 5,265,245 | 11/1993 | Nordstrom et al. | 395/600 |
| 5,287,521 | 2/1994 | Nitta et al. | 395/726 |
| 5,293,600 | 3/1994 | Vriezen | 395/479 |
| 5,293,614 | 3/1994 | Ferguson et al. | 395/600 |
| 5,339,411 | 8/1994 | Heaton, Jr. | 395/497.02 |
| 5,418,929 | 5/1995 | Tsuboi et al. | 395/497.02 |
| 5,420,999 | 5/1995 | Mundy | 395/497.04 |
| 5,432,908 | 7/1995 | Heddes et al. | 395/474 |
| 5,463,776 | 10/1995 | Voigt et al. | 395/600 |
| 5,481,702 | 1/1996 | Takahashi | 395/600 |
| 5,491,810 | 2/1996 | Allen | 395/444 |
| 5,561,785 | 10/1996 | Blandy et al. | 395/497.01 |

OTHER PUBLICATIONS

IBM TDB, "Return On Consumption-Based Dynamic Butter Management Scheme in Query Environments", vol. 32, No. 12, May 1990, pp. 250-251.

IBM TDB, "Method for Managing Dynamic Storage", vol. 32 No. 1, Jun. 1987, p. 448.

IBM TDB, "Dynamic Allocation of Basic Storage Module and its Control Circuitry in a Dual Stream Processor System", vol. 27, No. 8, Jan. 1985, pp. 4763-4764.

C. Maples, "A High-Performance, Memory-Based Interconnection System for Multicomputer Environments", May 1990, pp. 295-304, Supercomputing '90.

Magnusson et al. "Queue Locks on Cache Coherent Multiprocessors", Jun. 1994, pp. 165-171, Parallel Processing 1994 Symposium.

Enterprise Systems Architecture/390 "Principles of Operation", SA22-7201-00.

*Primary Examiner*—Eddie P. Chan
*Assistant Examiner*—Hong Kim

[57] ABSTRACT

Two or more storage allocation requests in a computer system can be made concurrently. Available storage blocks are chained together. A length of the respective block and a pointer to the next block in the chain are stored in each block. The chain is searched to identify one of the available blocks to satisfy one storage allocation request while permitting allocation of another block on the chain pursuant to another storage allocation request. While permitting allocation of another block on the chain pursuant to another storage allocation request, access to the one block is prevented pursuant to this other request and the length of the one block is reduced by an amount equal or greater than that of the one request such that after the preventing step another storage allocation request cannot be satisfied from the length by which the one block was reduced. Storage block return and allocation requests can also be made concurrently.

18 Claims, 15 Drawing Sheets

CONCURRENT STORAGE ALLOCATIONS OR RETURNS WITHOUT NEED TO LOCK FREE STORAGE CHAIN

The invention relates generally to computer systems having more than one CPU or a multitasking operating system and one or more CPUs, and deals more particularly with concurrent allocations or returns of storage blocks in such a computer system.

Existing computer systems include storage for storing programs, data, control information, buffers, work areas, etc. Some of the storage, such as that which stores a subsystem program, may be allocated at initial program load and required for the life of the program, while other of the storage, such as that which stores data and work areas may be required subsequently on a temporary basis. An operating system allocates the temporary storage in blocks of various sizes as requested by the program, and the program returns the storage blocks to the operating system when no longer needed. In a large computer system, the operating system may allocate and return thousands of storage blocks of various sizes every second.

Because the programs require and return blocks of various sizes and there is constant allocation and return, the storage area becomes fragmented, i.e. the available blocks are interspersed with the allocated blocks and both have various sizes. The operating system chains together the available blocks in address order to assist in the allocation and return processes and must update the chain after each allocation or return.

There are various known techniques for determining which available block to satisfy a request for storage. In one known technique, the operating system searches the available blocks on the chain for the first block that equals or exceeds the request size. In other known techniques, the operating system searches the available blocks to find an exact match for the requested size. If one is found, that block is selected for allocation. However, if none is found, the operating system may select the smallest available block that satisfies the request or an available block which exceeds the requested size by an amount which is likely to satisfy a subsequent request. To return a block to free storage, the operating system first searches the chain to determine the proper location, based on address, to position the block. Then, the operating system determines if the returned block is contiguous with one or two other available blocks on the chain, and if so, merges them together on the chain. If not, the operating system inserts the returned block into the chain by changing the chain pointer of the previous block to point to the newly returned block and writing a new chain pointer into the returned block to point to the next block on the chain.

As noted above, the chain of available blocks is searched during both the allocation process and the return process. In prior art computer systems with more than one CPU or a multitasking operating system with one or more CPUs, and shared storage, the chain of available blocks is also shared. When a program requests a storage allocation or return, the operating system locks the entire chain for this request so that if another program executing on another CPU or on the same CPU with a multitasking operating system makes another allocation or return request concurrently or an instant later, the request by this other program will not interfere with the request holding the lock. While this technique was effective in avoiding such interference or contention, it slowed operation by delaying one or more of the programs from obtaining or returning a storage block while the chain was locked pursuant to another request.

Accordingly, a general object of the present invention is to permit concurrent access by two or more programs to a single chain of available storage blocks.

SUMMARY OF THE INVENTION

The invention resides in a method for allocating storage blocks in a computer system such that two or more storage allocation requests can be made concurrently. Available storage blocks are chained together. A length of the respective block and a pointer to a next block in the chain are stored in each block. The chain is searched to identify one of the available blocks to satisfy one storage allocation request while permitting allocation of another block on the chain pursuant to another storage allocation request. While permitting allocation of another block on the chain pursuant to another storage allocation request, access to the one block is prevented pursuant to this other request and the length of the one block is reduced by an amount equal or greater than that of the one request such that after the preventing step another storage allocation request cannot be satisfied from the length by which the one block was reduced. According to one feature of the invention, the preventing and reducing steps are performed using a Compare and Swap type of instruction.

The invention also resides in a method for returning storage blocks in a computer system such that storage block return and allocation requests can be made concurrently. Available storage blocks are chained together in address order. In each block are stored a length of the respective block and a pointer to a next block on the chain. Pursuant to a request to return one block, a position in the chain for the one block is identified based on an address of the one block. Then, it is determined if this position is contiguous with another block on the chain. If the one block is contiguous with a second block having a length greater than zero on the chain, while permitting allocation from another block on the chain, access to the second block is prevented pursuant to other requests and the stored length of the second block is changed to zero. Consequently, after the preventing step, the second block will not be allocated pursuant to an allocation request.

DETAILED DESCRIPTION OF THE PREFERRED EMBODIMENTS

Figure 1:
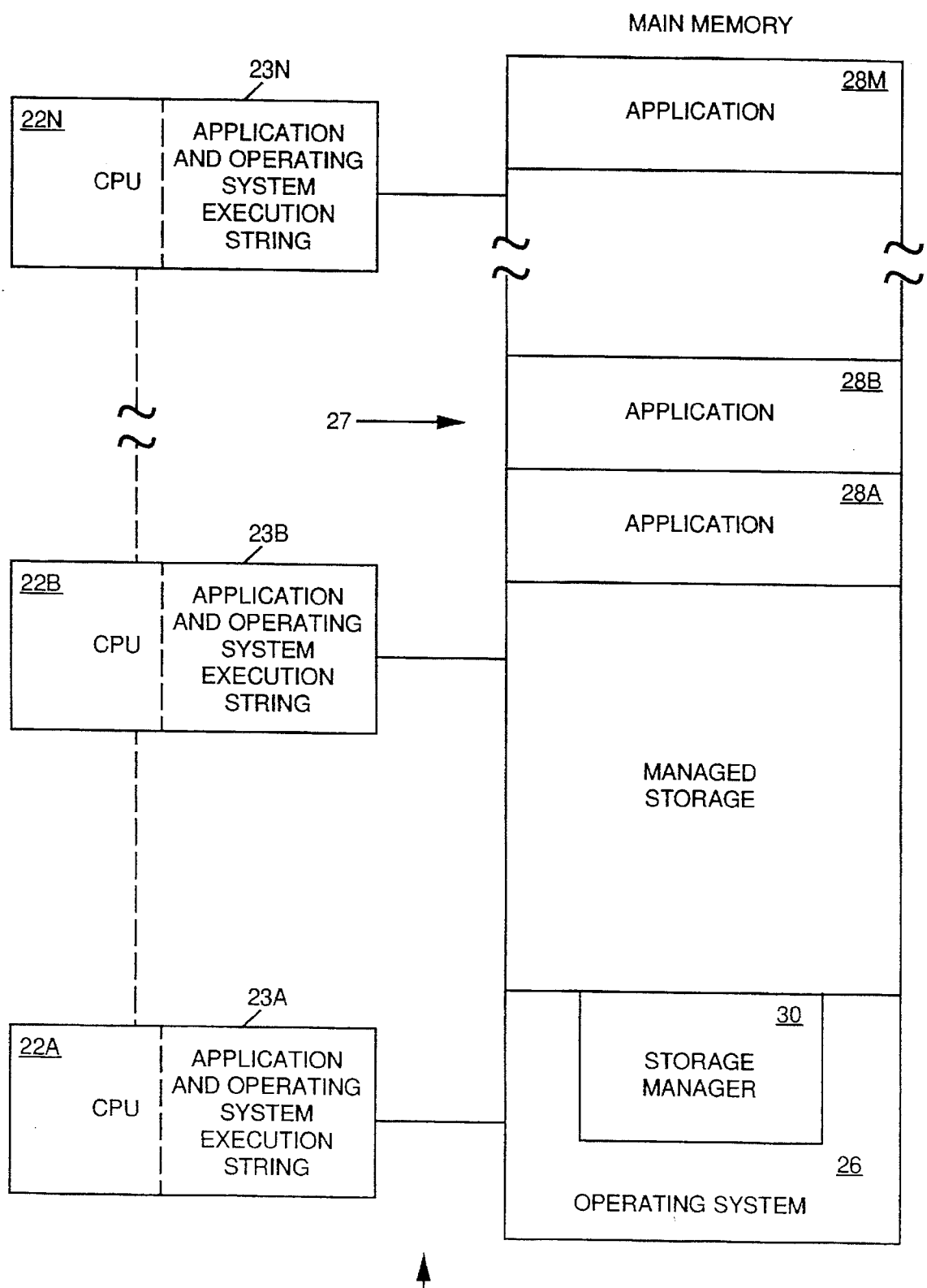
FIG. 1 is a block diagram of a computer system which includes the present invention.

Referring now to the Figures in detail wherein like reference numbers indicate like elements throughout the several Figures, FIG. 1 illustrates a computer system generally designated 20 according to the present invention. System 20 comprises multiple central processing units (CPUs) 22a–n, a main memory or storage 27 (in the form of RAM) and an operating system 26 and application programs 28a–m stored in storage 27. The operating system includes a storage manager 30 according to the present invention. In the description to follow, the operating system 26 is a single tasking, multiprocessing operating system but could instead, if desired, be a multitasking operating system for one or more processors. FIG. 1 also illustrates that all CPUs 22a–n can simultaneously execute the operating system 26 including the storage manager 28 by copying segments or execution strings of the operating system into respective dedicated storage 23a–n. All CPUs can likewise simultaneously execute the same or different application programs 28a–m.

Figure 2:
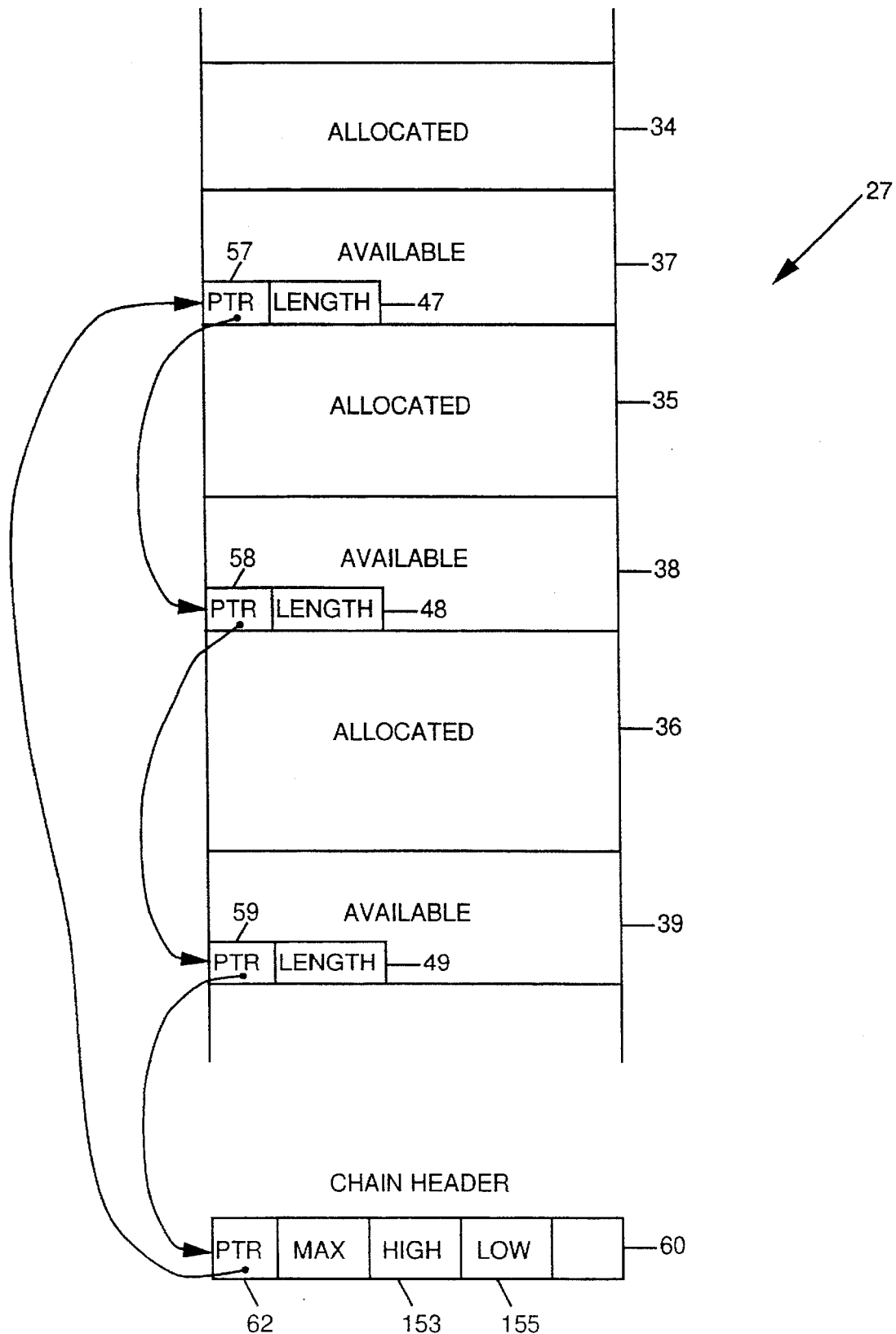
FIG. 2 illustrates storage including a chain of available storage blocks in the computer system of FIG. 1.

FIG. 2 illustrates that the storage 27 is fragmented and includes blocks 34–36 which are currently allocated and blocks 37–39 which are currently available for allocation. The allocated and available blocks have various sizes and are interspersed with each other. Each of the available blocks 37–39 includes in its lowest address region a length field 47–49, respectively which indicates the size or number in bytes of the respective available block and an adjacent address field or pointer 57–59, respectively. Each of the pointers points to the address field of the next, lower address available block. Thus, the pointers 57–59 form a chain of available blocks in order of decreasing address (although the invention can likewise be implemented if the available blocks are chained in order of ascending address). FIG. 2 also illustrates a chain header 60 which includes an address field or pointer 62 to the lowest address region of the highest address available block 37 in the chain. The chain header also includes a "maximum" field which indicates the length of the largest contiguous available block on the chain. If the request is larger than the maximum field value, then the search is aborted after a quick review of the chain header; otherwise the search proceeds from the highest address available block 37 to lower address available block in order until an available block is selected to satisfy the request. The pointer in the lowest address, available block 39 points to the address field of the chain header 60.

Figure 3:
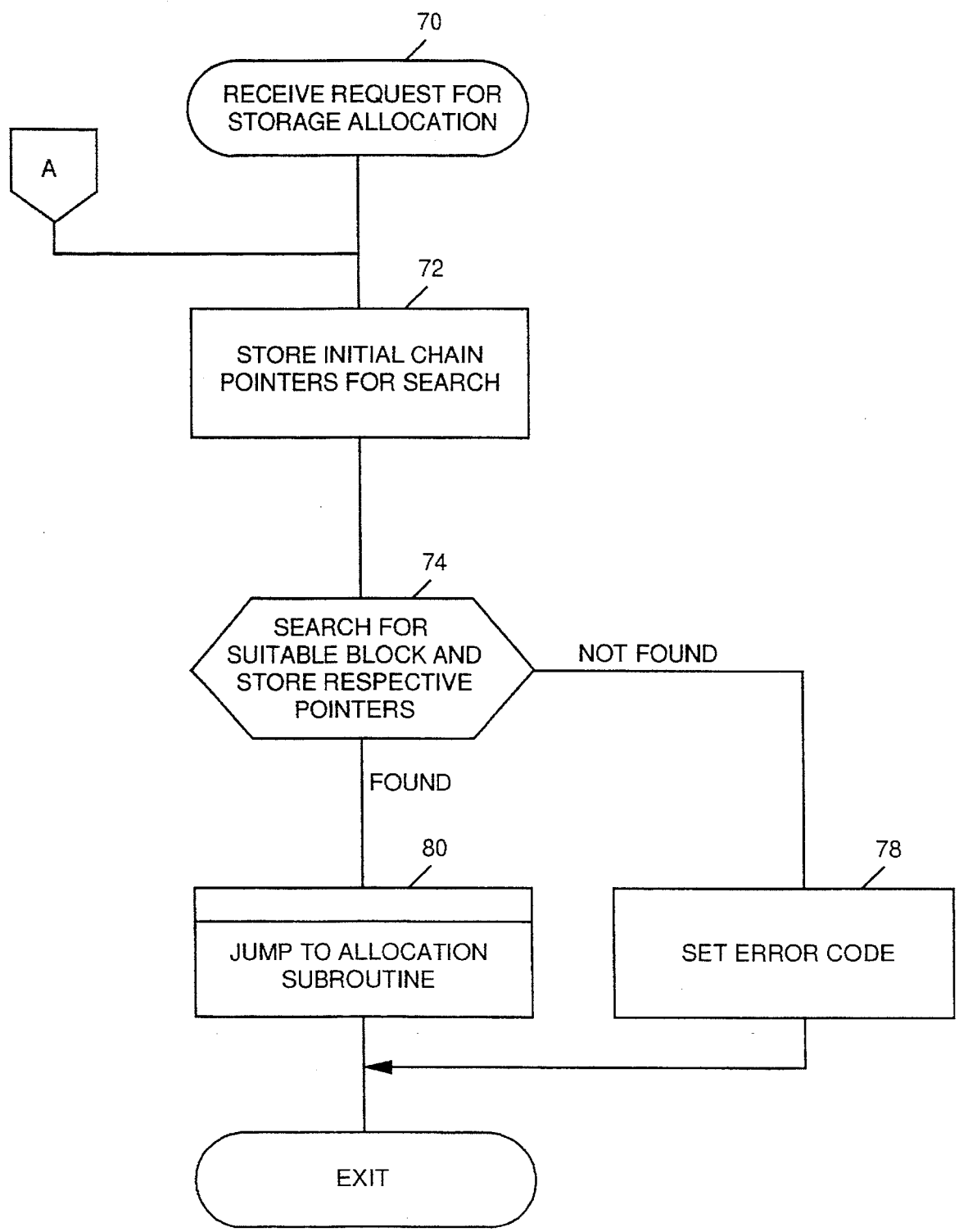
FIGS. 3–5 form a flow chart for the allocation of a storage block within the computer system of FIG. 1.

FIG. 3 illustrates the beginning of a process for allocating a block of the storage 27 according to the present invention. In step 70, the storage manager 30 receives a request from a program for a storage block of specified length. This request can be made for a program at initial program load by another function within the operating system to store the program itself or subsequently by the program itself for a data or work area. In response to the request, the storage manager initializes the chain pointers 57, 62 (step 72), i.e. loads them into registers for use during the allocation process. Next, the storage manager searches the chain in order beginning with block 37 for a suitable, available block (step 74). There are at least three known techniques for identifying the suitable block—first fit, best fit and usable fit. According to the "first fit" technique, the storage manager selects the first available block on the chain whose size is equal to or greater than that of the request. According to the "best fit" technique, the storage manager first searches the chain for a block that has the exact size of the request. If none is found after a search of the entire chain, the storage manager selects the available block which has a larger size than that of the request but leaves the smallest remainder compared to the other available blocks. According to the "usable fit" technique, the storage manager first searches the chain for a block that has the exact size of the request. If none is found after a search of the entire chain, the storage manager selects the available block which has a larger size than that of the request and leaves a remainder which has a usable size, i.e. greater than a predetermined threshold size. If no available block is found that meets the searching criteria, the storage manager returns an error code to the requestor (step 78). However, if an available block is found that meets the searching criteria, the storage manager proceeds to allocate the block (step 80).

The allocation process which is implemented depends on whether the block which is selected in step 74 is an exact match for the request or is larger than the request. In the latter case, the storage manager branches to step 84 of FIG. 4 and records in a register the length of the selected block and determines and records in a register the difference between the length of the request and the length of the selected block. Next, the storage manager executes steps 86 and 88 on the CPU of the requesting program using a type of instruction for which the target cannot be accessed by another program on another CPU (or another program on the same CPU if operating system 26 is multitasking) during the execution of steps 86 and 88. The "target" is defined in the instruction, and in this case, is the selected block. The other programs are prevented from accessing the target during execution of steps 86 and 88 by a serialization instruction for block concurrent interlock. This type of instruction is known as a "Compare and Swap" or Test and Set instruction in IBM ESA/390 or System/370 architecture and is explained in more detail as follows and in "Enterprise Systems Architecture/390 Principles of Operation", which is available from International Business Machines Corporation at Mechanicsburg, Pa. by order #SA22-7201-00. Chapter 5 pages 73–78 and chapter 7 pages 20–21 are hereby incorporated by reference as part of the present disclosure.

The definitions of the ESA/390 operations Compare and Swap (CS), Compare Double and Swap (CDS), and Test and Set (TS) require that an "atomic" update be made to a target storage location. For each instruction, the contents of the target storage location must be fetched and examined, and a new value stored into the target storage location. As observed by a program being executed on another processes in the system, or by a channel program being executed in the channel subsystem, the fetch from and store to this storage location must appear to be a single operation. This is generally accomplished by insuring that no other processor (or channel) may access the target storage location between the fetch and store operations.

Several mechanisms have been used to enforce this restriction in existing S/370, 370/XA, 370/ESA, and ESA/390 systems. These all build on the more general requirements for storage consistency in a multi-processor system. When storage buffers (caches) exist in such a system (as is common), a mechanism is needed to insure that stores by one processor are properly reflected in the other processors. This is generally done either by invalidating all copies of a storage location in other processors' caches immediately when a store is done, or by reserving a location for the exclusive use of a processor prior to allowing that processor to do a store. In the latter case, the exclusive access to that storage location may be retained by that processor until another processor requests access to that location, at which time the first processor may give up exclusivity of access. In either case, a cache invalidation or cache interrogation requests are communicated to all processors in the system. The processing of these requests may be concentrated in a central storage control element, or may be distributed across various elements of the system, including the various processors. In most designs, the management of storage consistency is performed on a cache block basis (typically 32 to 256 bytes).

One general mechanism for supporting "atomic" updates is to provide one or more "lock address" registers in the system. To perform an atomic update to a storage location, a processor loads the address of that location in the lock register and marks the lock register as active. The processor then fetches the data from that location, performs any execution functions required for the instruction, and stores modified data to the storage location. Finally, the processor marks the lock register as inactive. When the lock register is first marked as active, all copies of that storage location in all processors except the one controlling the lock register are invalidated. While the lock register is active, storage access (fetch and store) addresses from all processors are compared to the address in the lock register and any requests that match the lock register address (from any processor other than the one controlling the lock register) are blocked until the lock register is marked as inactive. This is done by delaying the request in the storage access controls or by rejecting the request, requiring the requester to try again at a later time. Many variations on this basic design are possible, including the number and management of lock registers, the mechanism for setting the lock registers, and the means of delaying requests that match the lock register address. The use of lock registers to control atomic updates is most common in designs that use invalidation for storage consistency, particularly where the caches are managed on a "store-through" basis.

Another general mechanism makes use of the exclusive access controls described above for general storage consistency. To perform an atomic storage update in this scheme, a processor fetches the storage location into its cache and obtains "exclusive access" to that location. (This is the same function as is needed prior to any operand store in this design.) As part of granting exclusive access for that location to that processor, any copies of that storage location in other processors' caches are invalidated. In addition to marking that location as being held with "exclusive" access, the processor also marks it as "locked", either via the cache directory or by means of specialized controls. In some designs, controls are set up for the store to that location at this time, and the pending store controls include the locked status. The processor then performs the required function, ending with a store to the specified location. Once the store operation is complete, the "locked" status is reset (though the location may still be held with "exclusive" status by that processor until it is requested by another processor). While the location is held "exclusive and locked", requests by other processors to access that location are denied, either by delaying the response to the request or by rejecting the request and requiring the requestor to try again later. The normal storage consistency rules already require (in such a design) that a processor may hold "exclusive" access to a storage location, and that other processors can access that location only if the first processor relinquishes that exclusivity; to support atomic updates, the processor holding the "exclusive and locked" status on a location need only delay its response to such a request. Again, various implementations of this basic design are possible, including ones that are more or less precise as to which requests by other processors are delayed. It is possible, for example, to simply delay all requests from other processors when a processor is in "interlocked update" mode; this has the effect of treating all locations currently buffered in that processor's cache as "locked".

Besides the variations within each of these approaches, hybrid designs are possible which combine elements of both, or which make use of different schemes for different situations requiring interlocked updates of storage.

Most if not all schemes for providing interlocked storage updates are prone to failure via deadlocks if usage rules are violated. In general, a processor that is controlling an active lock register, or that has exclusive and locked access to a storage location, must not execute any operation which requires a response from another processor unless it can be insured that that other processor is not attempting any storage access. This is required because a storage access by that other processor could be blocked, either directly or indirectly, by the lock register or locked status for the target of the interlocked update. This can occur even if the other processor's access is not to the same location as is locked, particularly in a system with three or more processors, since that processor's access could be waiting on a response from a third processor, which in turn is directly waiting on the storage lock to be released. Due to the variety and complexity of potential deadlock situations, it is generally required that the processor performing the interlocked update not execute any operation requiring a response from any other processor while the storage location is locked.

Another viable implementation for atomic read-modify-write operations is disclosed in U.S. Pat. No. 4,975,870 to Knicely et al., which patent is hereby incorporated by reference as part of the present disclosure.

As noted above, steps 86 and 88 are implemented as compare and swap operation 89 with the selected block as the target. In step 86, the storage manager compares the current length of the selected block as determined from the length field of the selected block to that recorded in step 84, and if they are different concludes that the selected block has been allocated from or merged with a returned block pursuant to a request from another program in the short time since step 84 was performed. In such a case, the storage manager cannot now allocate from the block selected in step 74 and branches back to step 70 to begin the selection and allocation process again. However, if the current length of the selected block is the same as that recorded in step 84, the storage manager concludes that there has not been an allocation from or merger with the selected block by another program since step 84 was performed and then proceeds to step 88. In step 88, the storage manager changes the length field of the selected block to the difference recorded in step 84. Because each available storage block is defined by its length field and lowest address, i.e. pointer from the next higher available storage block, the adjustment to the length field in step 88 effectively removes and prevents another request from accessing the upper portion of the selected block after step 88 even though no lock has been set and this upper portion has not yet been allocated to the requestor. This completes compare and swap operation 89.

In step 90, the storage manager updates predetermined registers with the starting address and length of the allocated block (portion). In step 92, the storage manager notifies the requestor that the predetermined registers now contain the starting address and length of the allocated block.

Figure 4:
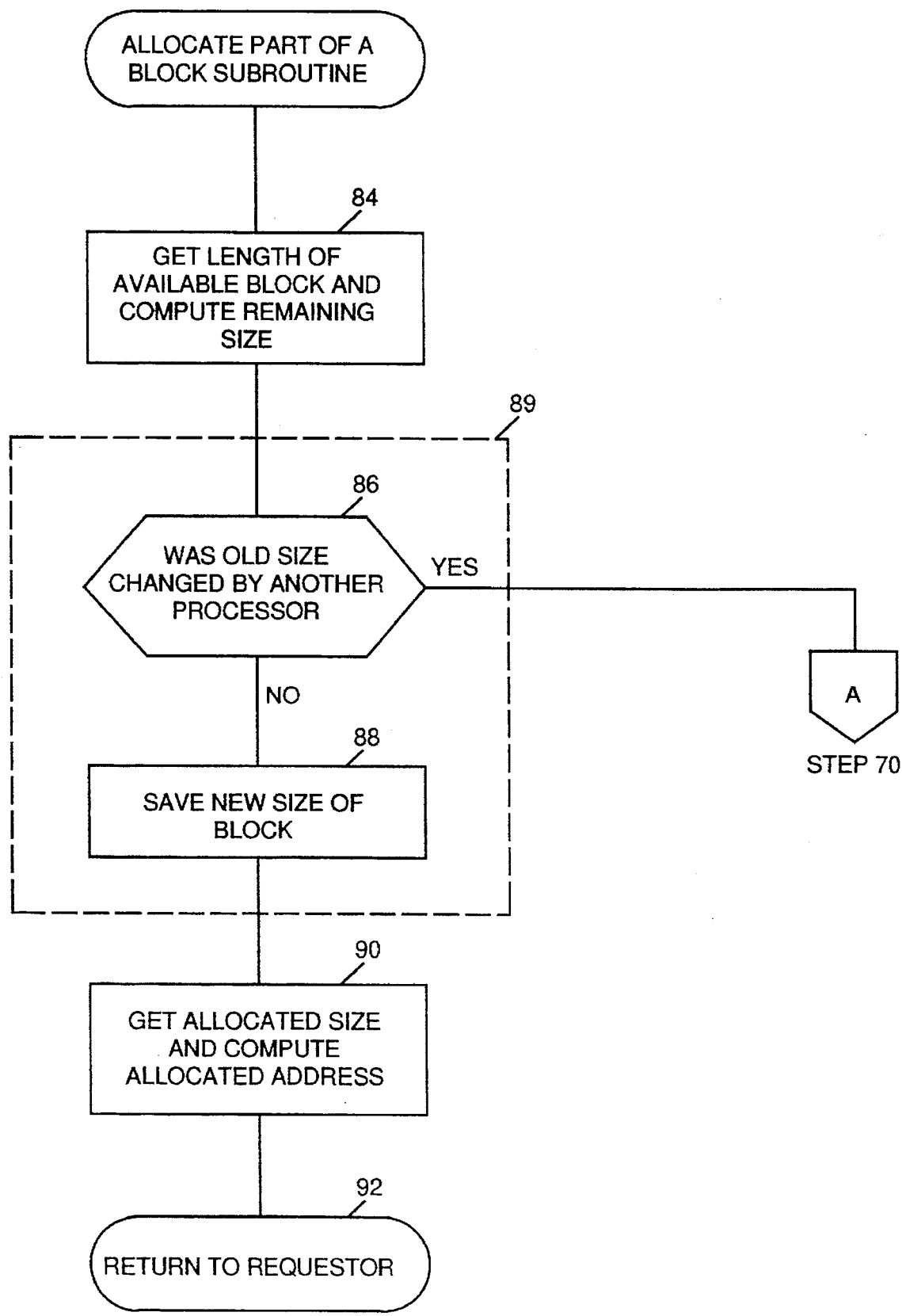

It should be noted that the process of FIG. 4 does not require a lock on the entire chain so that the rest of the chain can be simultaneously accessed for allocations from or return of blocks pursuant to requests from other programs. There is only one case where a conflict can arise—if there are simultaneous attempts to access the selected block, and in this case, there is no damage; rather, the selection and allocation process need only be repeated. However, typically the chain contains thousands of blocks so the occurrence of this case is rare.

Figure 5:
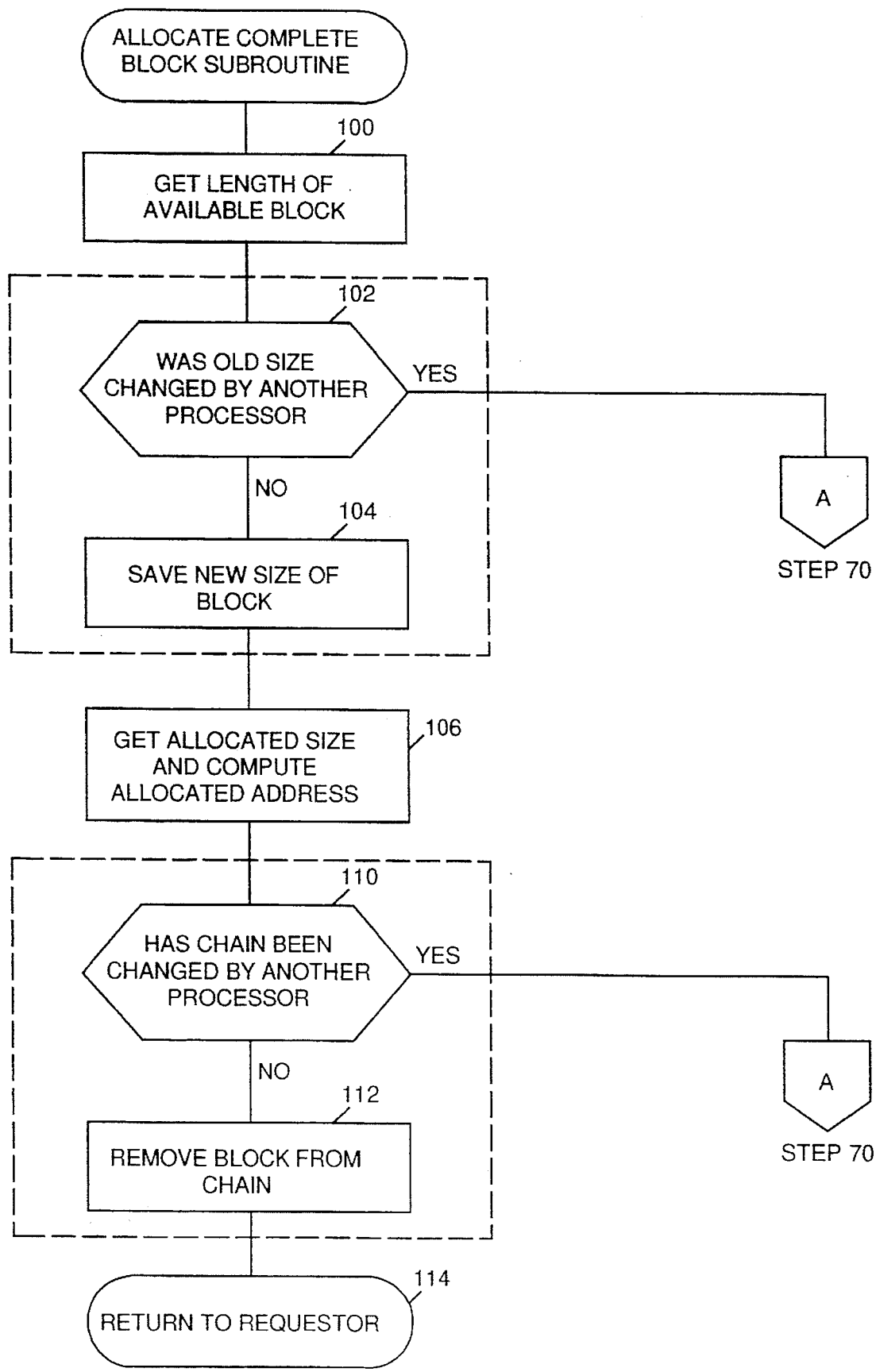

Referring again to step 80 of FIG. 3, if the block selected in step 74 was instead an exact match for the requested size, the storage manager proceeds to step 100 of FIG. 5 (instead of step 84 of FIG. 2). In step 100, the storage manager records in a register the length of the selected block and determines and records in a register the difference between the length of the selected block and that of the request. The difference will be zero unless the selected block was allocated from or merged with a returned block pursuant to a request by another program since step 74 was executed. Next, the storage manager performs steps 102 and 104 using the Compare and Swap or other type of instruction for which the target cannot be accessed for another request during the execution of steps 102 and 104. In step 102, the storage manager compares the current size of the selected block as indicated in the length field to that recorded in step 100. The current size will be the same as that recorded in step 100 unless the selected block was allocated from or merged with a returned block in the interim in which case, the storage manager returns to step 70 to select and allocate another available block to satisfy the request. However, if the current length is the same as that recorded in step 100, the storage manager proceeds to step 104 to change the length field to the difference between the size of the selected block and the requested size. This should be zero. Because the length field is now zero, there will not be another attempt to access the selected block after step 104 because it now appears that there is nothing available to access even though the selected block is still on the chain, no lock has been set and the storage block is not yet allocated to the requestor. Next, the storage manager stores the starting address and length of the selected block in predetermined registers (step 106).

At this point, the selected block should be removed from the chain because its length is zero. Thus, the storage manager executes steps 110 and 112 using the Compare and Swap or other type of instruction for which the target cannot be accessed pursuant to another request during execution of steps 110 and 112. In step 110, the storage manager determines, from the next higher address available block (which may actually be the chain header if the selected block is the highest address available block on the chain) identified in the registers updated in step 74, if the pointer in this next higher address available block on the chain still points to the selected block. If so, then this next higher address available block has not been allocated in full since step 74, and the storage manager changes the pointer in this next higher address available block to point to the next, lower address available block on the chain after the selected block (step 112). If the selected block is the lowest address block on the chain, then the pointer is changed to point to the chain header 60 in step 112. Finally, the storage manager returns a message to the requestor advising that the starting address and length of the allocated block are now contained in the predetermined registers (step 114). Step 114 completes the processing of the request for a storage block. It should be noted that no lock was ever set on the chain and the bulk of the chain can be accessed simultaneously for different allocation or return requests. There are only two cases where a conflict can arise, and in neither case is the result damaging; rather, in both cases, the selection and allocation process need only be repeated. The first case arises if two or more allocation or return requests cause attempts to access the same block on the chain simultaneously. The second case arises if one allocation or return request is being processed while another allocation or return request is being processed simultaneously for the next higher address block on the chain. However, it should be noted, that typically the chain contains thousands of blocks so the occurrence of either case is rare, and when it does occur, can easily be handled by a return to step 70.

Referring again to step 110, if the pointer of the next higher address available block does not point to the selected block then this next higher address available block has been allocated since execution of step 72 and the selected block cannot be allocated in full because the actual block which points to the selected block cannot now be identified with certainty. In such a case, the storage manager returns to step 70 to repeat the process of selecting and allocating another block.

Figure 6:
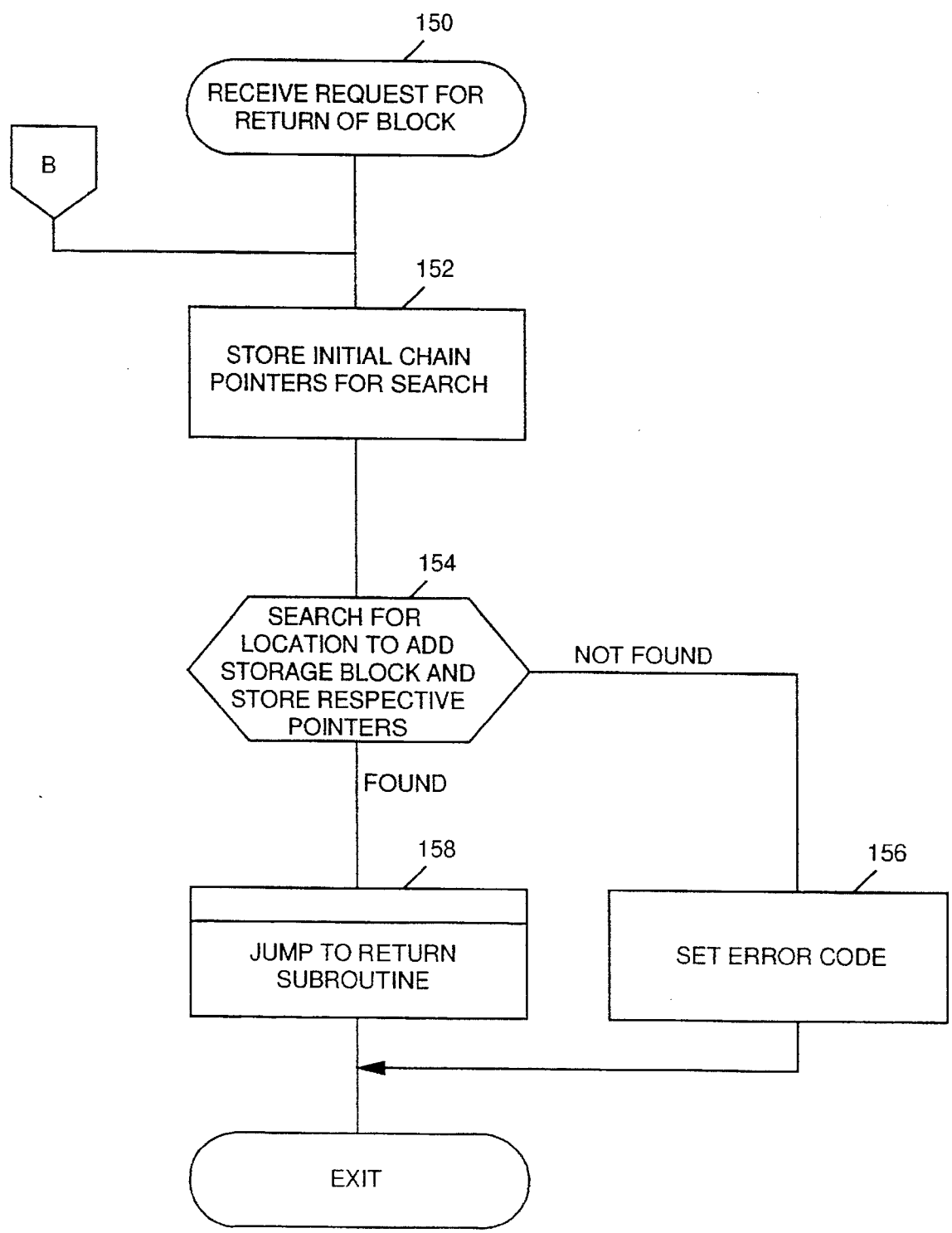
FIGS. 6, 7, 8(a,b), 9 and 10 form a flow chart for the return of a storage block within the computer system of FIG. 1.

FIG. 6 illustrates the beginning of a process according to the present invention for returning a block of storage 28. In step 150, the storage manager 30 receives a request from a program to return a storage block of specified length and beginning address. In response, the storage manager 30 initializes the chain pointers as described above (step 152). Next, the storage manager searches the chain from the highest address, available block 37 to lower address, available blocks searching for the proper location to which to return the block. As noted above, the available blocks are chained in descending order of address. If the block to be returned has a higher address than the highest address, available block 37 on the chain, then the block to be returned should be positioned first in the chain. If the block to be returned has an address between those of two other available blocks on the chain, then the block to be returned should be positioned between these two blocks. If the block to be returned has a lower address than the lowest address, available block 39 on the chain, then the block to be returned should be positioned last in the chain. As described in more detail below with reference to FIGS. 7–10, the storage manager also considers whether the block to be returned is contiguous with one or two other available, blocks on the chain in which case the storage manager merges the block to be returned with the one or two contiguous blocks.

The storage manager also knows the highest and lowest addresses of the storage 27 via fields 153 and 155 in the chain header, and if the block to be returned falls outside that range, the storage manager returns an error code to the requestor (step 156). Assuming the block to be returned falls within the range, the storage manager performs a process for inserting the returned block in the chain (step 158). The form of the process depends on whether the returned block is contiguous with only the next higher address available block (FIG. 7), contiguous with both the next higher and next lower address available blocks (FIGS. 8a,b), contiguous with only the next lower address available block (FIG. 9), or contiguous with neither the next higher available block if any nor the next lower available block, if any on the chain (FIG. 10). If the block to be returned is outside the range of the chain, then it can, at best, be contiguous with only one other block on the chain, but is still returned in accordance with FIG. 7, 9 or 10.

Figure 7:
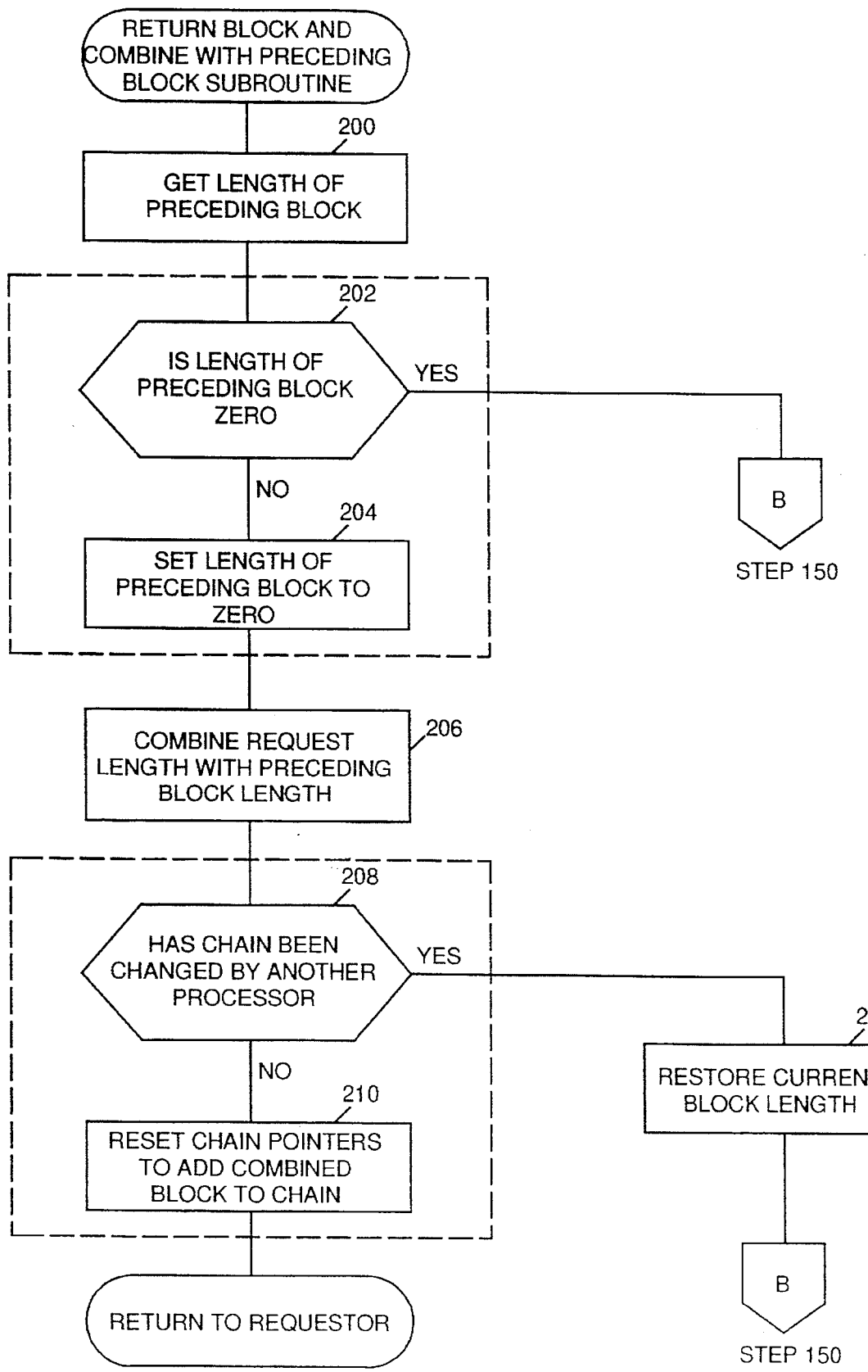
Figure 11:
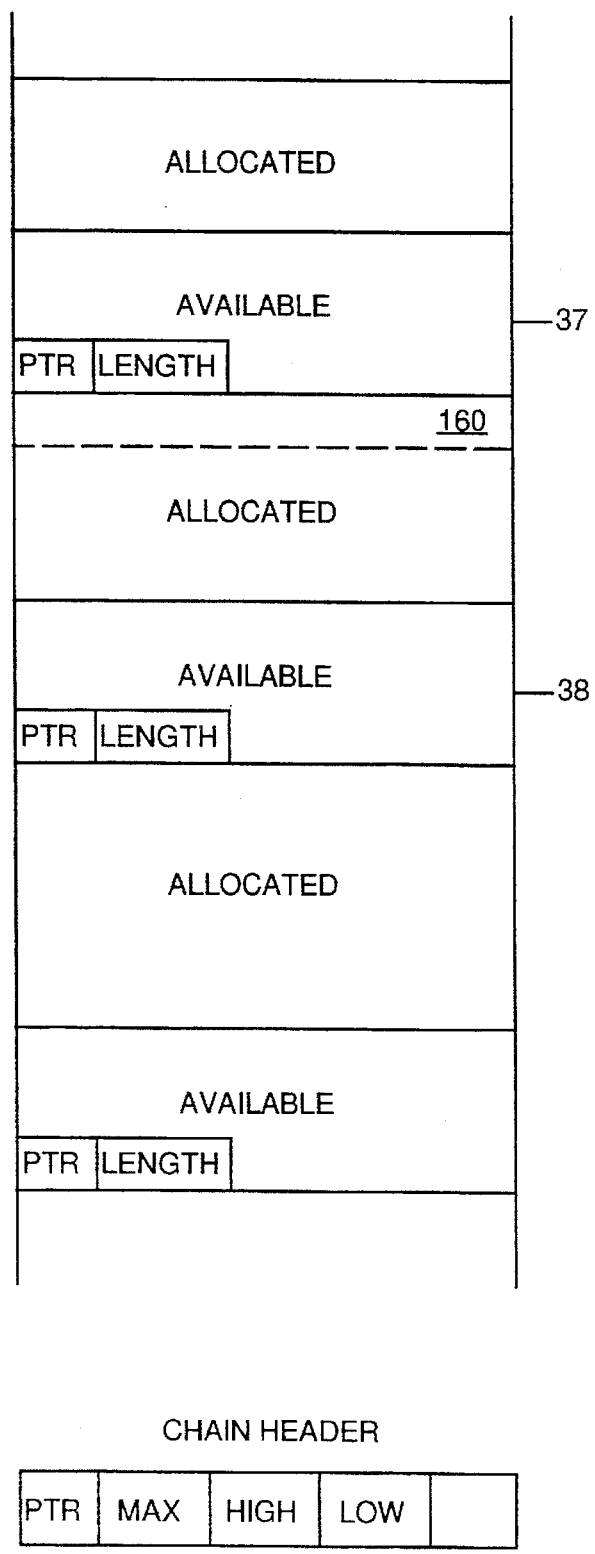
FIGS. 11–14 illustrate examples of storage blocks which are returned according to the flow chart of FIGS. 6–10.

If a block 160 (FIG. 11) to be returned is contiguous with the lowest address of one of the available blocks on the chain such as block 37, the storage manager proceeds to step 200 of FIG. 7 to record in a register the length of block 37. Next, the storage manager executes steps 202 and 204 using the Compare and Swap or other instruction for which the target (block 37) cannot be accessed pursuant to another request while steps 202 and 204 are being executed. In step 202, the storage manager determines, based on a current reading of the length field of block 37, if the current length of block 37 is zero or nonzero. If zero, then block 37 is currently in the process of being allocated in total pursuant to another request or currently involved in the return of another block pursuant to another request. Consequently, the storage manager returns to step 150 to begin the return process again with the expectation that after another iteration of steps 150–158, block 37 will be so allocated and removed from the chain so that block 160 can then be inserted in the chain. Referring again to step 202, assuming that the current length of block 37 is greater than zero, then the storage manager proceeds to set the length of block 37 to zero (step 204). This will prevent access to block 37 after step 204 pursuant to another allocation or return request because the apparently zero length of block 37 will not permit block 37 to be selected in step 74 during another allocation process and will cause a "restart request" from any of the return processes of FIGS. 7–9 (via steps 202, 222 and 302, respectively).

Referring again to FIG. 7, the storage manager next adds the length of block 160 to the length of block 37 recorded in step 200 and stores the result in a register (step 206). Next, the storage manager executes steps 208 and 210 using the Compare and Swap or other instruction for which the target (chain header 60) cannot be accessed pursuant to another request during execution of steps 208 and 210. In step 208, the storage manager determines if the pointer of the chain header (or next higher available block above the returned block if not the first on the chain) still points to block 37. If not, then the pointer of the chain header was changed pursuant to another request since execution of step 154 and the storage manager restores the length of block 37 before reset to zero in step 204 (step 212) and returns to step 150. However, if the pointer within the chain header was not changed since execution of step 154, the storage manager changes the pointer of the chain header to point to the lowest address region of the combined block (i.e. lowest address region of block 160). Also, the storage manager moves the block 37 pointer from its current location in the midst of the combined block (i.e. lowest address region of block 37), unchanged, to reside in the lowest address region of the combined block (i.e. lowest address region of block 160) (step 210). At this point, the block has been successfully "returned", i.e. combined with another, adjacent available block and proper adjustments made to the chain pointers.

Figure 8A:
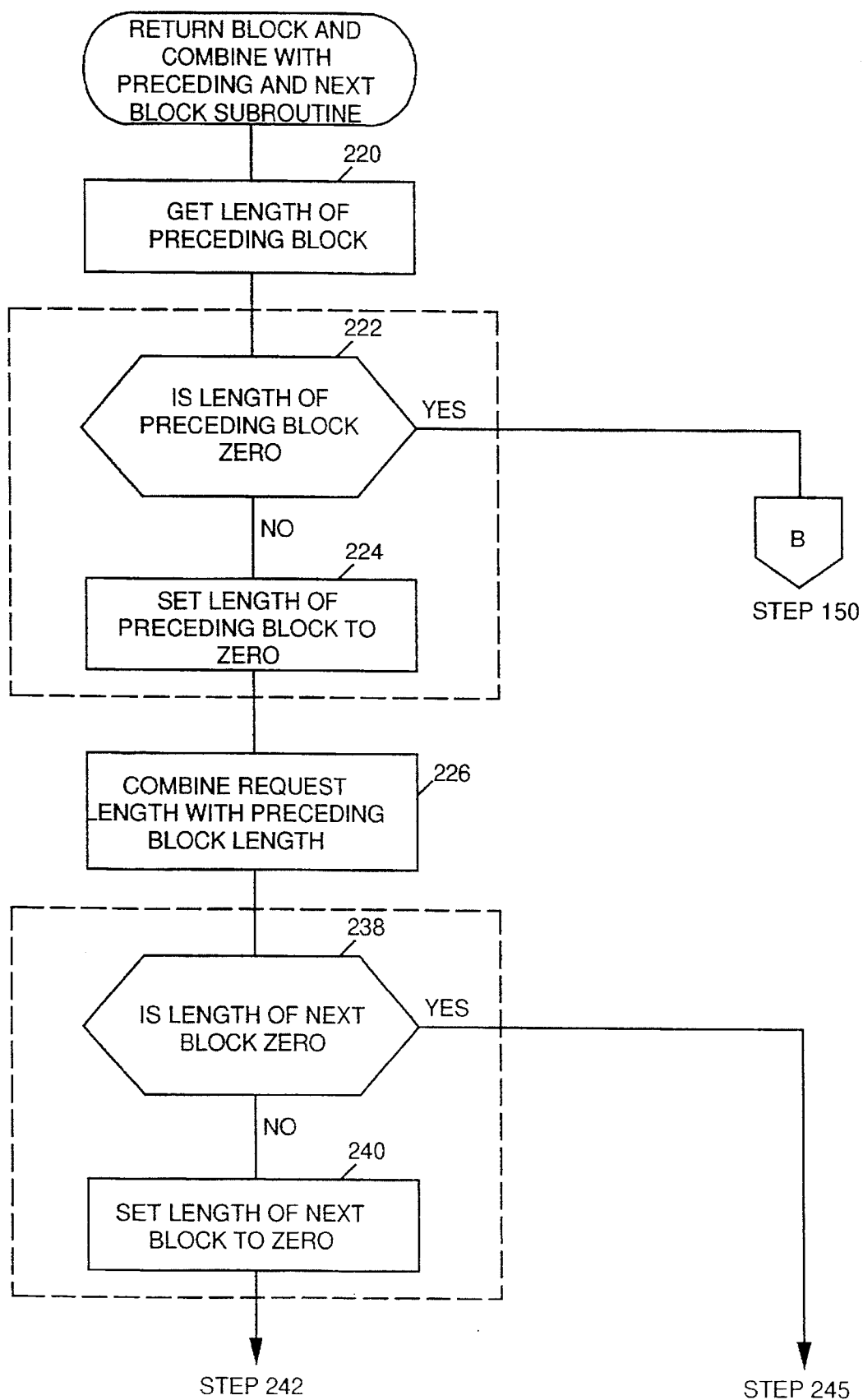
Figure 8B:
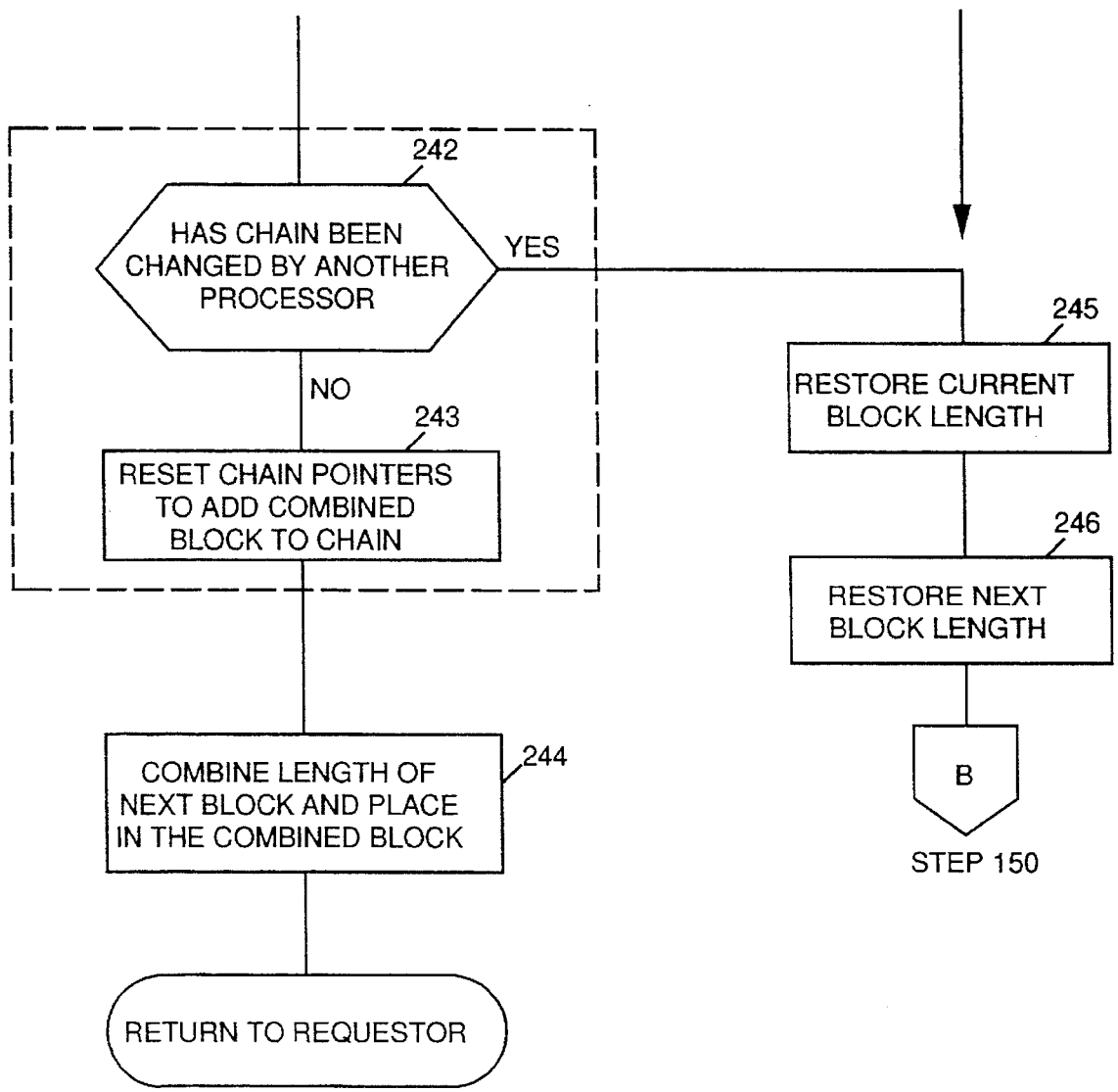
Figure 12:
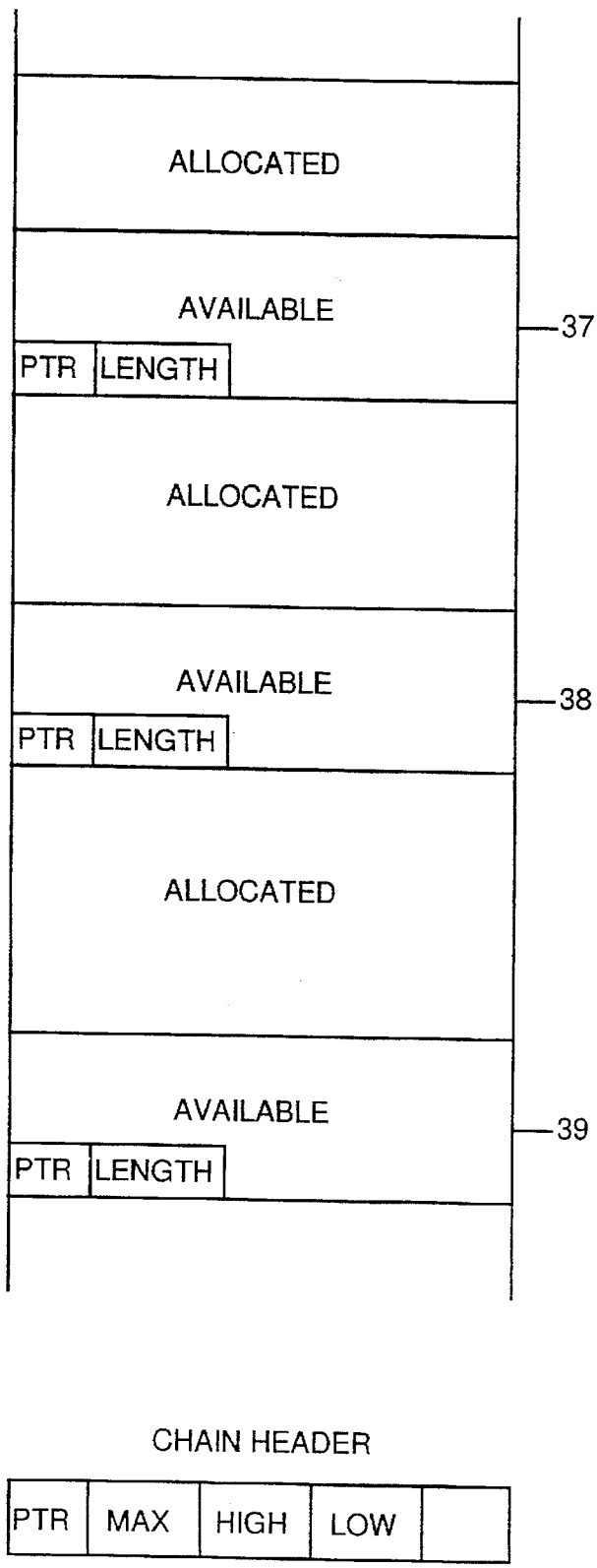

Referring again to step 158 of FIG. 6, if a block 162 (FIG. 12) to be returned is contiguous with two available blocks 38 and 39 on the chain which "straddle" block 162, the storage manager proceeds to step 220 of FIGS. 8(a,b) to record in a register the length of the higher address available block 38. Then, the storage manager executes steps 222 and 224 using the Compare and Swap or other instruction for which the target (block 38) cannot be accessed pursuant to another request during execution of steps 222 and 224. In step 222, the storage manager determines, based on the length field of block 38, if the current length of block 38 is zero or nonzero. If zero, then block 38 is currently in the process of being allocated in total to another requestor or involved in the return of another block pursuant to other requests. In such cases, the storage manager returns to step 150 to begin the return process again with the expectation that after another iteration of steps 150–158, block 38 will be so allocated and removed from the chain or no longer involved in the other return process and block 162 can be inserted in the chain. Referring again to step 222, assuming that the length of this one block is greater than zero, then the storage manager proceeds to set the length of block 38 to zero. This will prevent access to block 38 after step 224 pursuant to another request. Next, the storage manager adds the length of block 162 to the actual length of block 38 and stores the result in a register (step 226). Next, the storage manager executes steps 238 and 240 using the Compare and Swap or other instruction for which the target (block 39) cannot be accessed pursuant to another request during execution of steps 238 and 240. In step 238, the storage manager determines, based on the length field of block 39, if the current length of the lower address available block 39 is zero or nonzero. If zero, then block 39 is currently in the process of being allocated in total to another requestor or involved in another return process, and the storage manager returns to step 150 to begin the return process again with the expectation that after another iteration of steps 150–158, block 39 will be so allocated and removed from the chain. In which case, block 162 can then be inserted in the chain. Referring again to step 240, assuming that the length of block 39 is greater than zero, then the storage manager proceeds to set the length of block 39 to zero. This will prevent access of block 39 pursuant to another request to allocate from or merge a returned block with block 39. Next, the storage manager executes steps 242 and 243 using the Compare and Swap or other instruction for which the target (block 37) cannot be accessed pursuant to another request during execution of steps 242 or 243. In step 242, the storage manager determines if the pointer of block 37 still points to block 38 and if the pointer of block 38 still points to block 39. If so, then these pointers have not been changed since execution of step 154 and the storage manager changes the pointer of block 37 to point to the lowest address region of block 39 (it is not necessary to erase the pointer of block 38 because this pointer is in the middle of the combined block and will not be read) (step 243). Next, the storage manager adds the length of block 39 to the sum of blocks 38 and 162 in the register and updates the length field of the combined block with the sum of blocks 38, 162 and 39 (step 244). At this point, block 162 has been successfully "returned", i.e. merged with two other available contiguous blocks and proper adjustments made to the chain pointer of block 37.

However, referring again to decision 242, if the chain pointer of block 37 does not point to block 38 or if the pointer of block 38 does not point to block 39, then either pointer was changed pursuant to another allocation or return request since execution of step 154. Consequently, the storage manager restores the lengths of blocks 38 and 39 to the actual respective lengths before being reset to zero in steps 224 and 240, respectively (steps 245 and 246) and returns to step 150.

Figure 9:
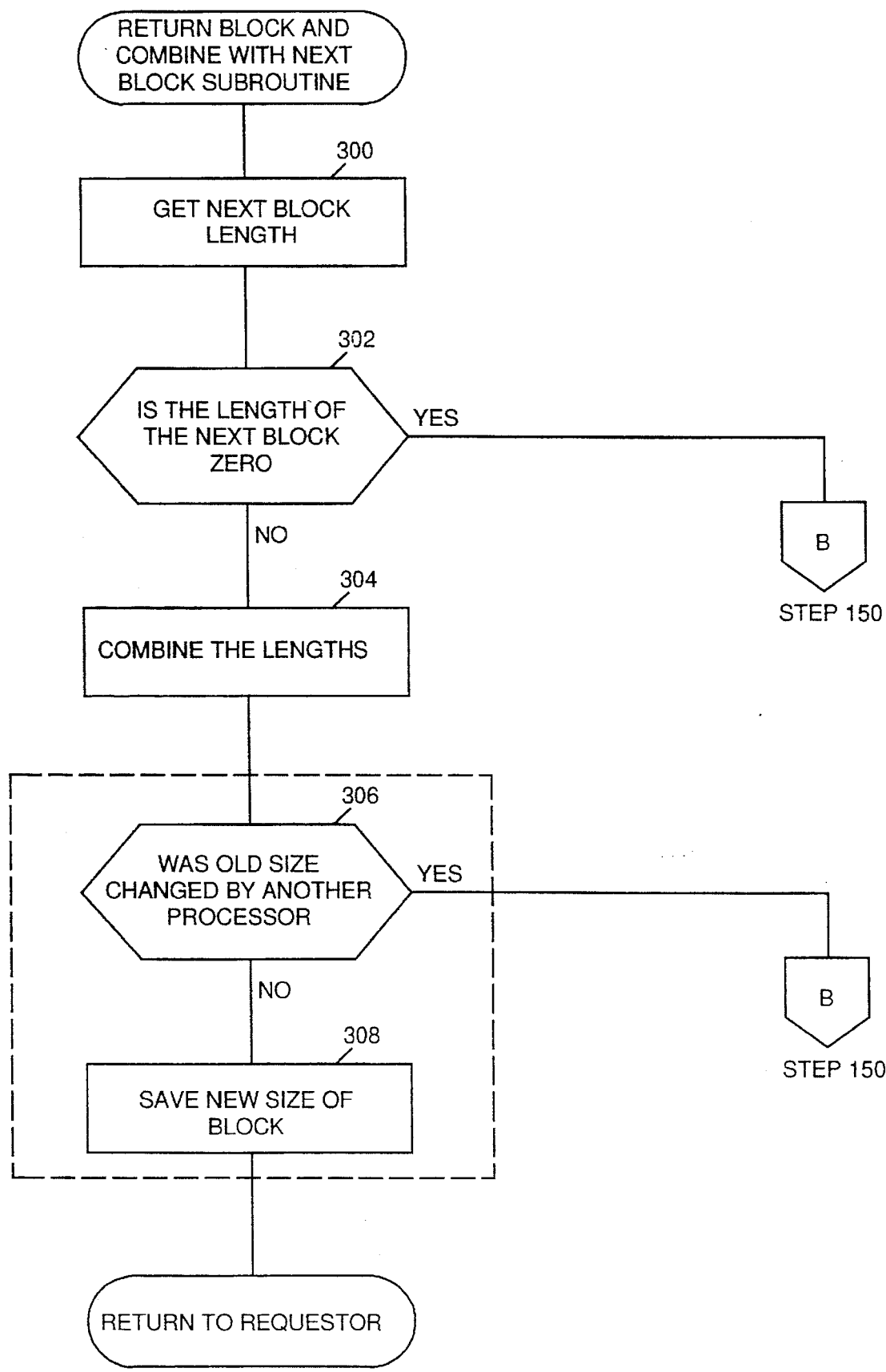
Figure 10:
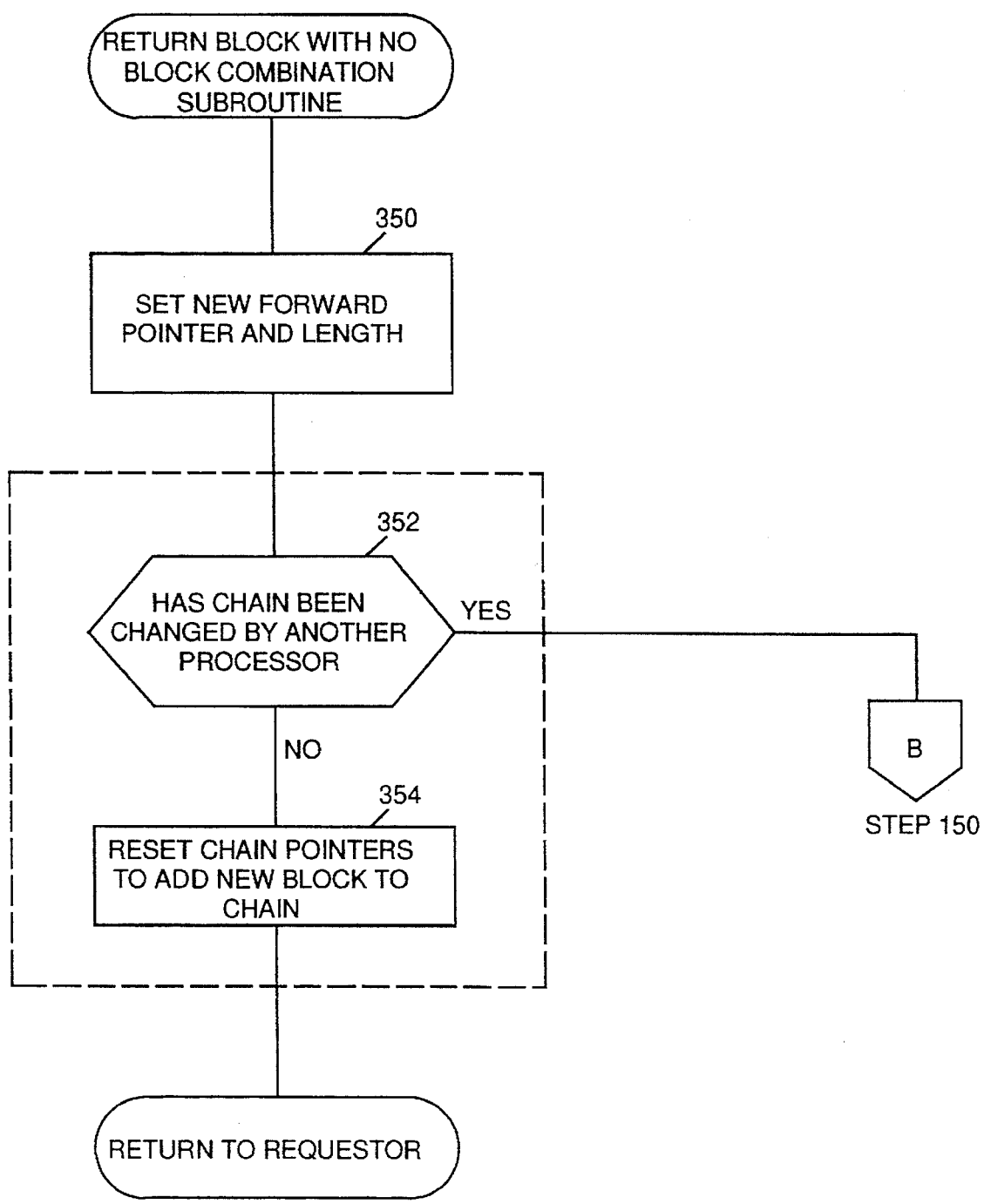
Figure 13:
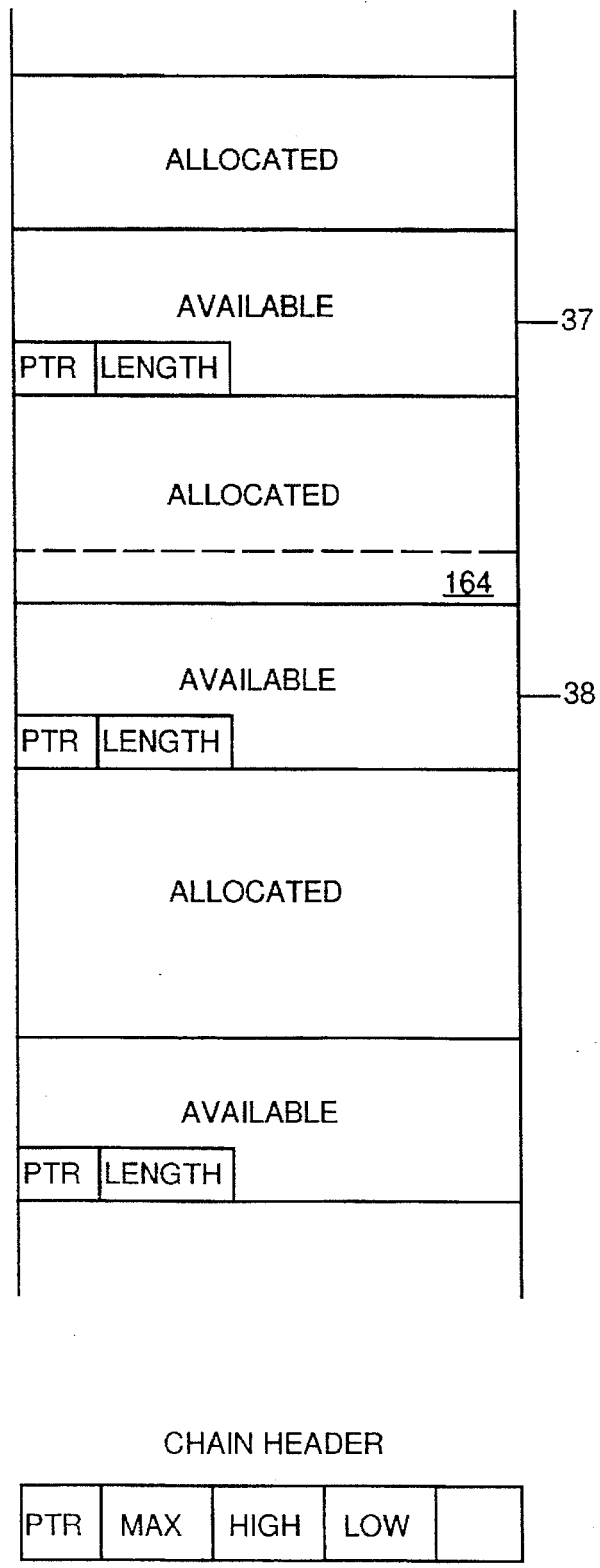

If a block 164 (FIG. 13) to be returned is contiguous with the highest address of one of the available blocks on the chain such as block 38, the storage manager proceeds to step 300 of FIG. 9 to record in a register the length of block 38. Next, the storage manager determines if the recorded length of block 38 is zero or nonzero. If zero, then block 38 is currently in the process of being allocated in total to another requestor or involved in a return process according to another request. Consequently, the storage manager returns to step 150 to begin the return process again with the expectation that after another iteration of steps 150–158, block 38 will be so allocated and removed from the chain or the other return process completed and then block 164 can be returned. Referring again to FIG. 9, the storage manager next adds the length of block 164 to the length of block 38 recorded in step 300 and stores the result in a register (step 304). Next, the storage manager executes steps 306 and 308 using the Compare and Swap or other instruction for which the target (block 38) cannot be accessed pursuant to another request during execution of steps 306 and 308. In step 306, the storage manager compares the length field of block 38 to that recorded in step 300, and if they are different concludes that the length field has been allocated from or merged with a return block pursuant to another request since step 300 was performed and branches back to step 150 to begin the return process again. However, if the current length of the block 38 is the same as that recorded in step 300, the storage manager proceeds to step 308. In step 308, the storage manager changes the length field of block 38 to the sum recorded in step 304. Because each available storage block is defined by its length field and lowest address, i.e. pointer from the next higher available storage block 37, the adjustment to the length field in step 308 completes the return process in the case where the returned block 164 is contiguous with the highest address of available block 38. There is no need to change any pointers.

Figure 14:
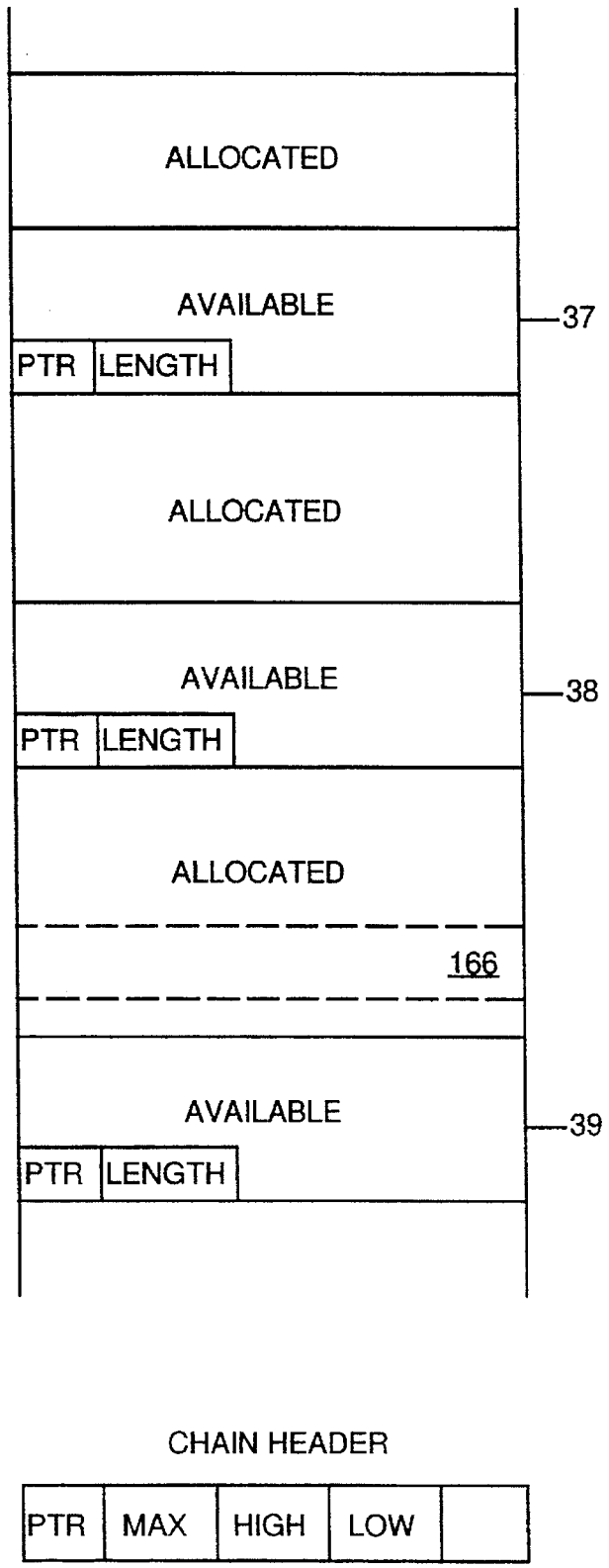

If a block 166 (FIG. 14) to be returned is not contiguous with any of the available blocks on the chain, the storage manager proceeds to step 350 of FIG. 10 to determine the proper position, based on address, for the block 166 to be inserted in the chain. In the illustrated example, the address of block 166 is between that of blocks 38 and 39 so the block will be inserted between blocks 38 and 39. Also, in step 350, the storage manager writes a pointer into the lowest address region of block 166 to point to the lowest address region of block 39. Next, the storage manager executes steps 352 and 354 using the Compare and Swap or other instruction for which the target (block 38) cannot be accessed pursuant to another request during execution of steps 352 or 354. In step 352, the storage manager determines if the pointer of block 38 still points to block 39. If so, then the pointer has not been changed pursuant to another request since execution of step 154 and the storage manager changes the pointer of block 38 to point to the lowest address of block 166 (step 354). At this point, block 166 has been successfully "returned", i.e. positioned in the chain and proper adjustments made to the chain pointers.

However, referring again to decision 352, if the chain pointer of block 38 does not point to block 39, then the pointer has been changed pursuant to another request since execution of step 154 and the storage manager returns to step 150.

Based on the foregoing, a storage manager according to the present invention has been disclosed. However, numerous modifications and substitutions can be made without deviating from the scope of the present invention. Therefore, the invention has been disclosed by way of illustration and not limitation and reference should be made to the following claims to determine the scope of the present invention.

I claim:

1. A method for allocating storage blocks in a computer system in which two or more storage allocation requests can be made concurrently, said method comprising the steps of:

chaining together available storage blocks and storing in each block a length of the respective block and a pointer to a next block in the chain;

after said chaining and storing steps, searching the chain to identify one of the available blocks with a length large enough to satisfy one storage allocation request while permitting allocation of another block on the chain pursuant to another storage allocation request;

after said searching step, recording the length of said one available block; and while permitting allocation of said other block on the chain pursuant to said other request, preventing access to said one available block pursuant to said other request and during the preventing step, comparing a length of said one available block currently stored in said one available block to the recorded length to determine if the length of said one available block was changed since the recording step, and if not, reducing the length of said one available block by an amount equal or greater than that of said one request such that after the preventing step said other request cannot be satisfied from the length by which said one available block was reduced.

2. A method as set forth in claim 1 wherein the reducing step comprises the step of changing the stored length of said one available block to a difference between the stored length and a length specified in said one request.

3. A method as set forth in claim 1 further comprising the step of notifying a source of said one request of an address of part or all of said one available block which was subtracted out in the changing step.

4. A method as set forth in claim 1 wherein the preventing and reducing steps are performed using a Compare and Swap type of instruction.

5. A method as set forth in claim 1 wherein each of said pointers points to one end address region of said next block on the chain, and the length of each block extends from said one end to the other end whereby allocation is made from the other end of said one available block.

6. A method as set forth in claim 1 wherein said reducing step reduces the length of said one available block to zero whereby all of said one available block is required to satisfy said one request.

7. A method as set forth in claim 1 further comprising the steps of:

while patting access to other blocks on the chain pursuant to a third storage allocation request, preventing access to a preceding block which points to said one available block pursuant to said third storage allocation request and changing said pointer of said preceding block to point to a block to which said one available block pointed.

8. A method as set forth in claim 7 wherein said reducing step reduces the length to zero.

9. A method as set forth in claim 1 wherein the searching step is performed using one of the following steps:

searching the chain for an available block which has the exact length of said one request;

searching the chain for an available block which is larger than the length of said one request but leaves the smallest difference;

searching the chain for an available block which is larger than the length of said one request but leaves a usable difference; or searching the chain for the first block which is large enough to satisfy said one request.

10. A method as set forth in claim 1 wherein said available blocks are chained together in address order.

11. A method for returning storage blocks in a computer system in which storage block return and allocation requests can be made concurrently, said method comprising the steps of:

chaining together available storage blocks in address order and storing in each block a length of the respective block and a pointer to a next block on the chain;

after said chaining and storing steps, pursuant to a request to return one block, identifying a position in the chain for said one block based on an address of said one block and determining if said position is contiguous with a second block on the chain;

after the identifying and determining steps, recording the length of said second block; and if said one block is contiguous with said second block, while permitting allocation from another block on the chain, preventing access to said second block pursuant to other requests and during the preventing step, comparing a length of said second block currently stored in said second block to the recorded length of said second block to determine if the length of said second block was changed since the recording step, and if not, changing the length of said second block to the sum of the lengths of said second block and said one block.

12. A method as set forth in claim 11 wherein said pointer of said second block is stored at one end region of said second block and said one block is contiguous with said one end of said second block.

13. A method for returning storage blocks in a computer system in which storage allocation and return requests can be made concurrently, said method comprising the steps of:

chaining together available storage blocks in address order and storing in each block a length of the respective block and a pointer to a next block on the chain;

pursuant to a request to return one block, identifying a position in the chain for said one block based on an address of said one block and determining if said position is contiguous with another block on the chain; and if said one block is contiguous with a second block on the chain,
while permitting allocation from said second and other blocks on the chain pursuant to other requests, recording a length of said second block after the identifying step;
while permitting allocation from other blocks on the chain pursuant to other requests, preventing allocation from said second block pursuant to other requests and comparing a length of said second block currently stored in said second block to said recorded length to determine if the length of said second block was changed since the recording step, and if not, changing the stored length of said second block to the sum of the currently stored length of said second block and the length of said one block.

14. A method as set forth in claim 13 wherein said pointer of said second block is stored at one end region of said second block and said one block is contiguous with the other end of said second block.

15. A method as set forth in claim 13 wherein said one block is discontiguous with said preceding block and said next block.

16. A method for allocating storage blocks in a computer system in which storage allocation and return requests can be made concurrently, said method comprising the steps of:

chaining together available storage blocks and storing in each block a length of the respective block and a pointer to a next block in the chain;

searching the chain to identify one of the available blocks to satisfy one storage allocation request while permitting return of another block to the chain pursuant to a storage return request;

after the searching step, recording the length of said one available block;

while permitting the return of said other block to the chain pursuant to said return request, preventing access to said one available block pursuant to said return request and during the preventing step, comparing a length of said one available block currently stored in said one available block to the recorded length to determine if the length of said one available block was changed since the recording step, and if not, reducing the length of said one available block by an amount equal or greater than that of said one request such that after the preventing step another storage allocation request cannot be satisfied from the length by which said one available block was reduced.

17. A computer system for allocating storage blocks, said system comprising:

means for chaining together available storage blocks and storing in each block a length of the respective block and a pointer to a next block in the chain;

means for searching the chain to identify one of the available blocks with a length large enough to satisfy one storage allocation request while permitting allocation of another block on the chain pursuant to another storage allocation request;

means for recording the length of said one available block after said one available block is identified; and while preventing access to said one available block pursuant to said other allocation request, means for comparing a length of said one available block currently stored in said one available block to the recorded length of said one available block to determine if the length of said one available block was changed since the length was recorded, and if not, reducing the length of said one available block by an amount equal or greater than that of said one allocation request such that after the preventing step a third storage allocation request cannot be satisfied from the length by which said one available block was reduced.

18. A computer program product for allocating storage blocks, said program product comprising:

a computer readable medium;

first program instruction means for instructing a processor to chain together available storage blocks and store in each block a length of the respective block and a pointer to a next block in the chain;

second program instruction means for instructing a processor to search the chain to identify one of the available blocks with a length large enough to satisfy one storage allocation request while permitting allocation of another block on the chain pursuant to another storage allocation request;

third program instruction means for instructing a processor to record the length of said one available block after said one available block is identified; and fourth program instruction means for instructing a processor, while preventing access to said one available block pursuant to said other request, to compare a length of said one available block currently stored in said one available block to the recorded length to determine if the length of said one available block was changed since the length was recorded, and if not, reduce the length of said one available block by an amount equal or greater than that of said one request such that after the preventing step another storage allocation request cannot be satisfied from the length by which said one available block was reduced; and wherein each of said program instruction means is recorded on said medium.

\* \* \* \* \*